United States Patent
Pietsch et al.

(10) Patent No.: US 10,570,306 B2
(45) Date of Patent: Feb. 25, 2020

(54) COMPOSITIONS CONTAINING POLYANION, ETHOXYLATED CATIONIC POLYMER AND PHYLLOSILICATES FOR IMPROVED OXYGEN BARRIER COATINGS

(71) Applicant: BASF SE, Ludwigshafen (DE)

(72) Inventors: Ines Pietsch, Speyer (DE); Konrad Roschmann, Ladenburg (DE); Gary Deeter, Livonia, MI (US); Meaghan McGuire, Tarrytown, NY (US); Russell Kenneth Feller, Elmsford, NY (US); Josef Breu, Bayreuth (DE); Hussein Kalo, Landshut (DE)

(73) Assignee: BASF SE, Ludwigshafen (DE)

( * ) Notice: Subject to any disclaimer, the term of this patent is extended or adjusted under 35 U.S.C. 154(b) by 87 days.

(21) Appl. No.: 15/742,644

(22) PCT Filed: Jul. 27, 2016

(86) PCT No.: PCT/EP2016/067918
§ 371 (c)(1),
(2) Date: Jan. 8, 2018

(87) PCT Pub. No.: WO2017/017146
PCT Pub. Date: Feb. 2, 2017

(65) Prior Publication Data
US 2018/0201803 A1 Jul. 19, 2018

Related U.S. Application Data

(60) Provisional application No. 62/198,705, filed on Jul. 30, 2015.

(51) Int. Cl.
| | | |
|---|---|---|
| B32B 27/08 | (2006.01) |
| B32B 27/20 | (2006.01) |
| B32B 27/30 | (2006.01) |
| C09D 133/02 | (2006.01) |
| C09D 133/04 | (2006.01) |
| C08K 3/34 | (2006.01) |
| C08L 77/02 | (2006.01) |
| C09D 133/06 | (2006.01) |
| C09D 7/62 | (2018.01) |
| B65D 65/42 | (2006.01) |
| C08J 7/04 | (2020.01) |
| C09D 5/00 | (2006.01) |

(52) U.S. Cl.
CPC ........... *C09D 133/02* (2013.01); *B65D 65/42* (2013.01); *C08J 7/047* (2013.01); *C09D 5/00* (2013.01); *C09D 7/62* (2018.01); *C09D 133/064* (2013.01); *C08J 2367/02* (2013.01); *C08J 2433/02* (2013.01); *C08J 2479/02* (2013.01)

(58) Field of Classification Search
None
See application file for complete search history.

(56) References Cited

U.S. PATENT DOCUMENTS

| | | | |
|---|---|---|---|
| 3,586,478 | A | 6/1971 | Neumann |
| 3,954,943 | A | 5/1976 | Neumann et al. |
| 5,578,672 | A | 11/1996 | Beall et al. |
| 6,117,932 | A | 9/2000 | Hasegawa et al. |
| 2004/0225066 | A1 | 11/2004 | Flat et al. |

FOREIGN PATENT DOCUMENTS

| | | |
|---|---|---|
| EP | 1 290 071 | 3/2003 |
| JP | 2013-59930 A | 4/2013 |
| WO | 98/31719 A1 | 7/1998 |
| WO | 03/055792 A1 | 7/2003 |
| WO | 2005/049674 A1 | 6/2005 |
| WO | 2005/049676 A1 | 6/2005 |
| WO | 2006/108856 A2 | 10/2006 |
| WO | 2007/002322 A1 | 1/2007 |
| WO | 2009/060059 A2 | 5/2009 |
| WO | 2009/130200 A1 | 10/2009 |
| WO | 2011/023587 A2 | 3/2011 |
| WO | 2011/089089 A1 | 7/2011 |
| WO | 2012/175427 A2 | 12/2012 |
| WO | 2012/175431 A2 | 12/2012 |
| WO | 2013/182444 A1 | 12/2013 |
| WO | 2014/164632 A1 | 10/2014 |
| WO | 2015/028191 A1 | 3/2015 |

OTHER PUBLICATIONS

G. Choudalakis. "Permeability of Polymer/Clay Nanocomposites: A Review" European Polymer Journal, vol. 45, Issue 4, Apr. 2009, pp. 967-984.

Matthias Stöter, et al., "Nanoplatelets of Sodium Hectorite Showing Aspect Ratios of =20 000 and Superior Purity" Langmuir, vol. 29, Issue 4, 2013, pp. 1280-1285.

International Search Report dated Sep. 5, 2016, in PCT/EP2016/067918, filed Jul. 27, 2016.

*Primary Examiner* — Tae H Yoon
(74) *Attorney, Agent, or Firm* — Oblon, McClelland, Maier & Neustadt, L.L.P.

(57) ABSTRACT

Described is an aqueous composition comprising (a) at least one polyanion, (b) at least one ethoxylated cationic polymer, and (c) at least one phyllosilicate. The composition can be used for providing oxygen barrier properties to a polymer film.

20 Claims, No Drawings

COMPOSITIONS CONTAINING POLYANION, ETHOXYLATED CATIONIC POLYMER AND PHYLLOSILICATES FOR IMPROVED OXYGEN BARRIER COATINGS

The present application is a U.S. National Stage Entry of PCT/EP2016/067918, which was filed on Jul. 27, 2016, and claims priority to provisional application No. 62/198,705, which was filed on Jul. 30, 2015.

The invention relates to aqueous compositions comprising (a) at least one polyanion, (b) at least one ethoxylated cationic polymer, and (c) at least one phyllosilicate. The compositions can be used for providing oxygen barrier properties to polymer films.

When products that are susceptible to oxidation or are sensitive to oxygen are packaged it is important that the packaging materials used have oxygen-barrier properties, i.e. that they have minimum oxygen transmission or minimum oxygen permeability. Polymer films used as packaging materials and made e.g. of polyolefins, such as polyethylene, or of oriented polypropylene, or of polyesters, e.g. polyethylene terephthalate, generally have relatively high oxygen permeability when they are used in uncoated form. Various measures have therefore been proposed for increasing the oxygen-barrier properties of these packaging materials.

WO 07/002322 describes coated polymer films with oxygen-barrier properties. The coating composition is a solution of a maleic acid/acrylic acid copolymer and of a vinyl alcohol/vinylamine copolymer. After the coating process, the two copolymers of the coating composition crosslink on the polymer film. WO 98/31719 describes coating compositions for barrier coatings. The compositions comprise an ethylenically unsaturated acid monomer and a polyamine, comprising an incorporated crosslinking agent. After the coating process, crosslinking takes place via initiation of a free-radical-induced polymerization reaction. WO 2011/023587 describes the use of specific polyelectrolyte complexes for providing an oxygen barrier to packaging materials made of polymer films. The polymer film is either coated with an aqueous dispersion comprising a dispersed polyelectrolyte complex previously produced by water-in-water emulsion polymerization, or the polymer film is coated with a composition comprising a polyelectrolyte complex produced from anionic polymer and from cationic surfactant, or the polymer film is coated with at least three alternating layers, where respectively one of two adjacent layers comprises an anionic polyelectrolyte component and the other of two adjacent layers comprises a cationic polyelectrolyte component, and polyelectrolyte complexes form at the opposite, adjacent interfaces of the alternating layers. WO 2013/182444 describes the use of aqueous polyanion-polyethyleneimine solutions for producing polymer films with oxygen-barrier properties. Packaging films known hitherto with oxygen-barrier properties are not yet entirely satisfactory, especially when used in high humidity atmosphere. For example the barrier coating described in WO 2011/023587 needs an additional moisture-protection system for protecting the barrier from humidity.

The gas permeability effects of polymer/clay nanocomposite materials that consist of inorganic platelet-shaped fillers in polymer matrices are known (G. Choudalakis, A. D. Gotsis, European Polymer Journal 45 (2009) 967-984). Barrier materials based on phyllosilicates are described in WO 2011/089089, WO 2012/175427 and WO 2012/175431. Oxygen barrier compositions comprising specific organic polymers and specific inorganic materials such as clay or nanofillers are described for example in WO 2009/130200, US 2004/0225066 or WO 03/055792.

It was an object of the present invention to provide further improved compositions and processes which permit production of polymer films with good oxygen-barrier properties, in particular good oxygen-barrier properties in high humidity environments without the need for additional protective coatings.

The invention provides an aqueous composition comprising
(a) at least one polyanion,
(b) at least one ethoxylated cationic polymer, and
(c) at least one phyllosilicate.

The invention also provides the use of the aqueous composition for providing oxygen barrier properties to a polymer film.

The invention also provides a coated polymer film comprising an oxygen barrier coating obtainable via the use according to the invention as described herein, wherein at least one side of the polymer film has been coated with the aqueous composition according to the invention.

The oxygen barrier properties can be measured by the permeability test described in the examples. The term oxygen-barrier property means that oxygen transmission rate (OTR) has been reduced in comparison with an uncoated substrate. The oxygen transmission rate of polymer films coated according to the invention is preferably less than 20%, in particular less than 10%, or less than 5%, e.g. from 1 to 3%, of the value for the uncoated polymer film measured at 23° C. and 0% relative humidity; and preferably less than 40% or less than 30% or less than 20% measured at 25° C. and 75% relative humidity.

The amount of polyanion (a) in the aqueous composition is preferably from 10 to 90 wt. %, more preferably from 20 to 80 wt. %, referring to solids content.

The amount of ethoxylated cationic polymer (b) in the aqueous composition is preferably from 10 to 90 wt. %, more preferably from 20 to 80 wt. %, referring to solids content.

The amount of phyllosilicate (c) in the aqueous composition is preferably from 5 to 75 wt. %, more preferably from 5 to 50 wt. % and even more preferably from 5 to 30 wt. %, referring to solids content.

The weight ratio of the polyanion (calculated without neutralizing agent) to the ethoxylated cationic polymer is preferably from 10:1 to 10:9, more preferably from from 10:2 to 10:5. The weight ratio of the sum of polyanion (a) and ethoxylated cationic polymer (b) to phyllosilicate (c) is preferably from 95:5 to 50:50, more preferably from 95:5 to 70:30 and even more preferable from 90:10 to 75:25.

The concentration of the sum of polyanion and ethoxylated cationic polymer in the aqueous composition, is preferably at least 1% by weight, in particular at least 5% by weight and up to 50% by weight or up to 60% by weight, for example from 1 to 50% by weight or from 5 to 40% by weight.

Preferably, the polyanion (a) and the ethoxylated cationic polymer (b) are dissolved in the aqueous composition. Preferably the polyanion is a polymer comprising acid groups neutralized with at least one base selected from the group consisting of inorganic bases and monovalent organic bases and said polymer comprising acid groups having a weight average molecular weight of at least 10000 g/mol prior to neutralization; and the ethoxylated cationic polymer has preferably a weight average molecular weight of at least 2500 g/mol or of at least 10000 g/mol.

The average molecular weight can be determined by gel permeation chromatography with polymethyl methacrylate as standard (DIN 55672-2:2008:06).

The polyanion is a polymer comprising neutralized acid groups, also named anionic polymer. Anionic polymers are polymers having anionic or acidic groups, in particular organic polymers having carboxylate, phosphate, or sulfate groups or the corresponding acid groups. The term "anionic polymer" also comprises the corresponding polymers with acid groups, as long as they are at least partially neutralized by monovalent bases when used in the aqueous composition according to the invention.

Examples of suitable anionic polymers are those formed by free-radical polymerization of ethylenically unsaturated anionic monomers capable of free-radical polymerization. The term "anionic monomer" comprises monomers with at least one anionic or acidic group, wherein the acidic group can be neutralized by a base. The group of anionic polymers also comprises copolymers made of at least one anionic monomer and of one or more than one different non-ionic, nonacidic copolymerizable monomer(s). The polyanion can also be synthesized by polymerization of one or more non-ionic monomers such as acid derivatives like for example ethylenically unsaturated acid esters, followed by a hydrolysis to obtain an anionic polymer. Suitable non-ionic monomers can be alkyl acrylates, alkyl methacrylates (e.g. tert-butyl acrylate, ethyl acrylate etc.) or ethylenically unsaturated acid anhydrids such as maleic anhydride.

Examples of ethylenically unsaturated anionic monomers that can be used are monoethylenically unsaturated $C_3$ to $C_{10}$ or $C_3$ to $C_5$ carboxylic acids, such as acrylic acid, methacrylic acid, ethacrylic acid, crotonic acid, maleic acid, fumaric acid, itaconic acid; or monoethylenically unsaturated sulfonic acids such as vinylsulfonic acid, styrenesulfonic acid, acrylamidomethylpropanesulfonic acid; or monoethylenically unsaturated phosphonic acids such as vinylphosphonic acid or ((meth)acryloyloxy)alkyl phosphonic acids with up to 10 C-atoms in the alkyl group (e.g. 2-(methacryloyloxy)ethyl phosphonic acid); or phosphoalkyl (meth)acrylates with up to 10 C-atoms in the alkyl group (e.g. phosphoethyl methacrylate; and salts of these acids such as the alkali-metal salts, alkaline-earth-metal salts, or ammonium salts of these acids. Among the anionic monomers preferably used are acrylic acid, methacrylic acid, maleic acid, itaconic acid and 2-acrylamido-2-methylpropanesulfonic acid. Particular preference is given to aqueous solutions of polymers based on acrylic acid. The anionic monomers can either be polymerized alone to give homopolymers or else can be polymerized in a mixture with one another to give copolymers. Examples of these are the homopolymers of acrylic acid, homopolymers of methacrylic acid, copolymers of acrylic acid and maleic acid, copolymers of acrylic acid and methacrylic acid, and copolymers of methacrylic acid and maleic acid. Preferably, the polyanion is selected from polymers capable of being produced from monomers selected from the group consisting of monoethylenically unsaturated $C_3$ to $C_{10}$ carboxylic acids, vinylsulfonic acid, styrenesulfonic acid, acrylamidomethylpropanesulfonic acid, vinylphosphonic acid, and salts of these acids, preferably acrylic acid, methacrylic acid, maleic acid, itaconic acid. Most preferably the polyanion is a polyacrylic acid or a copolymer of acrylic acid and maleic acid.

However, the anionic monomers can also be polymerized in the presence of at least one other ethylenically unsaturated monomer. These monomers can be nonionic or can bear a cationic charge. Examples of nonionic comonomers are acrylamide, methacrylamide, N—$C_1$ to $C_3$-alkylacrylamides, N-vinylformamide, styrene, acrylic esters of monohydric alcohols having from 1 to 20 carbon atoms, e.g. in particular methyl acrylate, ethyl acrylate, isobutyl acrylate, and n-butyl acrylate, methacrylic esters of monohydric alcohols having from 1 to 20 carbon atoms, e.g. methyl methacrylate and ethyl methacrylate, and also vinyl acetate and vinyl propionate.

Suitable cationic monomers which can be copolymerized with the anionic monomers are dialkylaminoethyl acrylates, dialkylaminoethyl methacrylates, dialkylaminopropyl acrylates, dialkylaminopropyl methacrylates, dialkylaminoethylacrylamides, dialkylaminoethylmethacrylamides, dialkylaminopropylacrylamides, dialkylaminopropylmethacrylamides, diallyldimethylammonium chloride, vinylimidazole, and also the respective basic monomers neutralized with acids and/or quaternized. Individual examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, and diethylaminopropyl methacrylate, dimethylaminoethylacrylamide, dimethylaminoethylmethacrylamide, dimethylaminopropylacrylamide, dimethylaminopropylmethacrylamide, diethylaminoethylacrylamid, and diethylaminopropylacrylamide.

The basic monomers can have been completely or only to some extent neutralized or quaternized, for example to an extent of from 1 to 99% in each case. Preferred quaternizing agent used for the basic monomers is dimethyl sulfate. However, the monomers can also be quaternized with diethyl sulfate or with alkyl halides, such as methyl chloride, ethyl chloride, or benzyl chloride. The amount used of the cationic monomers is at most such that the resultant polymer bears a net charge which is anionic at pH<6.0 and a temperature of 20° C. The excess of anionic charge in the resultant amphoteric polymers is, for example, at least 5 mol %, preferably at least 10 mol %.

The amounts of the non-anionic, non-acidic comonomers used in the production of the anionic polymers are such that the resultant polymers are preferably water-soluble when diluted with water at pH above 7.0 and at a temperature of 20° C., and have an anionic net charge. Examples of the amount of non-anionic, non-acidic comonomers, based on the total amount of monomers used in the polymerization reaction, are from 0 to 99% by weight, preferably from 1 to 75% by weight, or an amount in the range from 1 to 25% by weight.

Examples of preferred copolymers are copolymers made of from 25 to 90% by weight of acrylic acid and from 75 to 10% by weight of acrylamide. It is preferable to polymerize at least one ethylenically unsaturated $C_3$ to $C_5$ carboxylic acid in the absence of other monoethylenically unsaturated monomers. Particular preference is given to homopolymers of acrylic acid, obtainable via free-radical polymerization of acrylic acid in the absence of other monomers; or to copolymers of acrylic acid and maleic acid.

In one embodiment, the anionic polymer comprises 2-acrylamido-2-methylpropanesulfonic acid (AMPS). It is preferable to copolymerize acrylic acid with AMPS. The amount of AMPS here can be, for example, from 0.1 to 15 mol % or from 0.5 to 10 mol %, based on the amount of all of the monomers.

The polymerization reaction for making the anionic polymer can also be conducted in the presence of at least one crosslinking agent. This then gives copolymers with higher molar mass than when the anionic monomers are polymerized in the absence of any crosslinking agent. Crosslinking agents used can comprise any of the compounds that have at least two ethylenically unsaturated double bonds within the molecule. Examples of crosslinking agents are triallylamine, the triallyl ether of pentaerythritol, the tetraallyl ether of pentaerythritol, methylenebisacrylamide, N,N'-divinylethyleneurea, allyl ethers comprising at least two allyl groups, or vinyl ethers having at least two vinyl groups, where these ethers derive from polyhydric alcohols, e.g. sorbitol, 1,2-ethanediol, 1,4-butanediol, trimethylolpropane, glycerol, diethylene glycol, and from sugars, such as sucrose, glucose, mannose; other examples are dihydric alcohols which have from 2 to 4 carbon atoms and which have been completely esterified with acrylic acid or with methacrylic acid, e.g. ethylene glycol dimethacrylate, ethylene glycol diacrylate, butanediol dimethacrylate, butanediol diacrylate, diacrylates or dimethacrylates of polyethylene glycols with molecular weights from 300 to 600, ethoxylated trimethylenepropane triacrylates or ethoxylated trimethylenepropane trimethacrylates, 2,2-bis(hydroxymethyl)butanol trimethacrylate, pentaerythritol triacrylate, pentaerythritol tetraacrylate, and triallylmethylammonium chloride. If crosslinking agents are used in the production of the solutions of the invention, examples of the respective amounts used of crosslinking agent are from 0.0005 to 5.0% by weight, preferably from 0.001 to 1.0% by weight, based on the entirety of monomers used in the polymerization reaction, provided that the polymer remains water-soluble at pH>7. Crosslinking agents preferably used are the triallyl ether of pentaerythritol, the tetra allyl ether of pentaerythritol, N,N'-divinylethylene urea, allyl ethers of sugars such as sucrose, glucose or mannose, where these ethers comprise at least two allyl groups, and triallylamine, and also mixtures of these compounds.

If at least one anionic monomer is polymerized in the presence of at least one crosslinking agent, it is preferable to produce crosslinked copolymers of acrylic acid and/or methacrylic acid by polymerizing acrylic acid and/or methacrylic acid in the presence of the triallyl ether of pentaerythritol, the tetraallyl ether of pentaerythritol, N,N'-divinylethyleneurea, allyl ethers of sugars such as sucrose, glucose or mannose, where these ethers comprise at least two allyl groups, and triallylamine, and also mixtures of these compounds. Preferably the amounts of crosslinking agents used in the polymerization reaction are limited to an extent so that the resultant anionic polymers are soluble in aqueous solution at pH>7.0.

The weight average molecular weight of the polymer comprising acid groups prior to neutralization is preferably at least 10000 g/mol, more preferably at least 30000 g/mol, for example from 10000 to 200000 g/mol or from 30000 to 150000 g/mol.

In one embodiment of the invention the polyanion (a) is neutralized polyacrylic acid or a neutralized copolymer of acrylic acid and maleic acid and the weight average molecular weight of the anionic polymer (a) is from 10000 to 200000 g/mol or from 30000 to 150000 g/mol.

The acid groups of the polyanion are partially or completely neutralized with at least one base selected from the group consisting of inorganic bases and monovalent organic bases base. A monovalent organic base is an organic compound with a single basic group, e.g. a single amino group. Bases are for example NaOH, KOH, $Ca(OH)_2$, $Ba(OH)_2$, sodium carbonate, potassium carbonate, trisodium phosphate, ammonia or primary, secondary or tertiary organic amines. Preferred bases are ammonia, sodium hydroxide and triethanol amine. Most preferred are volatile bases such as ammonia.

The degree of neutralization of the polyanion is preferably from 30 to 100%, more preferably from 50 to 100%, based on the total molar amount of acidic groups of the anionic polymer.

The aqueous composition comprises at least one ethoxylated cationic polymer (b). The cationic polymers are preferably water-soluble, i.e. they have at least 1 g/l solubility in water at 20° C. Cationic polymers are polymers having cationic groups, in particular organic polymers having quaternary ammonium groups. Cationic polymers as defined herein also include polymers having primary, secondary, or tertiary amine groups, which can be protonated either by acids comprised within the reaction medium or by acid groups of the anionic polymer, thus being converted to cationic groups. The amine groups or ammonium groups of the cationic polymer can be present in the form of substituents or as a portion of the polymer chain. They can also be a portion of an aromatic or non-aromatic ring system.

Examples of suitable ethoxylated cationic polymers are those from the following group:
(a) ethoxylated polymers comprising vinylimidazolium units,
(b) ethoxylated polydiallyldimethylammonium halides,
(c) ethoxylated polymers comprising vinylamine units,
(d) ethoxylated polymers comprising ethyleneimine units,
(e) ethoxylated polymers comprising dialkylaminoalkyl acrylate units and/or comprising dialkylaminoalkyl methacrylate units, and
(f) ethoxylated polymers comprising dialkylaminoalkyl acrylamide units and/or comprising dialkylaminoalkyl methacrylamide units.
(g) ethoxylated polymers comprising imidazole and epichlorhydrine units Examples of ethoxylated cationic polymers are
(a) ethoxylated homopolymers of vinylimidazolium methosulfate and/or ethoxylated copolymers of vinylimidazolium methosulfate and N-vinylpyrrolidone,
(b) ethoxylated polydiallyldimethylammonium chlorides,
(c) ethoxylated polyvinylamines,
(d) ethoxylated polyethyleneimines,
(e) ethoxylated polydimethylaminoethyl acrylate, ethoxylated polydimethylaminoethyl methacrylate, ethoxylated copolymers of acrylamide and dimethylaminoethyl acrylate, and ethoxylated copolymers of acrylamide and dimethylaminoethyl methacrylate, where the basic monomers can also be present in the form of the salts with mineral acids, or in quaternized form, and
(f) ethoxylated polydimethylaminoethylacrylamide, ethoxylated polydimethylaminoethylmethacrylamide, and ethoxylated copolymers of acrylamide and dimethylaminoethylacrylamide.

The basic monomers can also be present in the form of the salts with mineral acids, or in quaternized form. The weight average molecular weights $M_w$ of the ethoxylated cationic polymers are preferably at least 500, or at least 1000 or at least 2000 or at least 2500 and preferably up to 3 million or up to 1 million, preferably up to 500 000, or up to 100 000.

It is preferable to use the following as ethoxylated cationic polymers:
(a) ethoxylated homopolymers of vinylimidazolium methosulfate and/or ethoxylated copolymers of vinylimidazolium methosulfate and N-vinylpyrrolidone with weight average molecular weight $M_w$ of from 500 to 500 000 in each case, (b) ethoxylated polydiallyldimethylammonium chlorides with weight average molecular weight $M_w$ of from 1000 to 500 000,
(c) ethoxylated polyvinylamines with weight average molecular weight $M_w$ of from 500 to 1 million, and
(d) ethoxylated polyethyleneimines with weight average molecular weight $M_w$ of from 500 to 1 million.

The copolymers listed under (a) of ethoxylated vinylimidazolium methosulfate and N-vinylpyrrolidone comprise by way of example from 10 to 90% by weight of copolymerized N-vinylpyrrolidone. Instead of N-vinylpyrrolidone it is possible to use, as comonomer, at least one compound from the group of the ethylenically unsaturated $C_3$ to $C_5$ carboxylic acids, particular examples being acrylic acid or methacrylic acid, or to use the esters of these carboxylic acids with monohydric alcohols comprising from 1 to 18 carbon atoms, e.g. methyl acrylate, ethyl acrylate, isopropyl acrylate, n-butyl acrylate, isobutyl acrylate, methyl methacrylate, ethyl methacrylate, or n-butyl methacrylate. By way of example, synthesis of suitable copolymers (a) is described in WO 2005/049674 (copolymers 1, 2, 3) or in WO 2005/049676 (copolymer 1).

A polymer of group (b) that can be used with preference is ethoxylated polydiallyldimethylammonium chloride. Other suitable ethoxylated polymers are copolymers of diallyldimethylammonium chloride and dimethylaminoethyl acrylate, copolymers of diallyldimethylammonium chloride and dimethylaminoethyl methacrylate, copolymers of diallyldimethylammonium chloride and diethylaminoethyl acrylate, copolymers of diallyldimethylammonium chloride and dimethylaminopropyl acrylate, copolymers of diallyldimethylammonium chloride and dimethylaminoethylacrylamide, and copolymers of diallyldimethylammonium chloride and dimethylaminopropylacrylamide. The copolymers of ethoxylated diallyldimethylammonium chloride comprise, in copolymerized form by way of example from 1 to 50 mol %, mostly from 2 to 30 mol %, of at least one of the comonomers mentioned. An exemplary synthetic protocol is given in WO 2005/049676 (copolymer 3).

Ethoxylated polymers (c) comprising vinylamine units are obtainable via polymerization of N-vinylformamide, if appropriate in the presence of comonomers, and hydrolysis of the vinylformamide polymers with elimination of formyl groups to form amino groups. The degree of hydrolysis of the polymers can by way of example be from 1 to 100%, mostly being in the range from 60 to 100%. The average molecular weights $M_w$ are up to 1 million. Subsequent alkoxylation as described in EP 1290071 (cf. example 2) yields the inventive ethoxylated polymers (c).

Polymers of group (d) comprising ethyleneimine units, for example polyethyleneimines, are commercially available products sold under the tradename Sokalan® or Lupasol®, examples being Sokalan® HP 20 or Lupasol® SC-61B. These cationic polymers are polymers of ethyleneimine which are produced via polymerization of ethyleneimine in an aqueous medium in the presence of small amounts of acids or of acid-forming compounds, examples being halogenated hydrocarbons, e.g. chloroform, carbon tetrachloride, tetrachloroethane, or ethyl chloride, or are condensates of epichlorohydrin and compounds comprising amino groups, examples being mono- and polyamines, e.g. dimethylamine, diethylamine, ethylenediamine, diethylenetriamine, and triethylenetetramine, or ammonia. By way of example, they have weight average molecular weights $M_w$ of from 500 and up to 3 million or up to 1 million, preferably from 1000 to 500 000.

This group of cationic polymers also includes graft polymers of ethyleneimine on compounds having a primary or secondary amino group, examples being polyamidoamines made of dicarboxylic acids and of polyamines. The ethyleneimine-grafted polyamidoamines can also, if appropriate, be reacted with bifunctional crosslinking agents, for example with epichlorohydrin or with bischlorohydrin ethers of polyalkylene glycols.

Ethoxylated cationic polymers of group (e) that can be used are polymers comprising dialkylaminoalkyl acrylate units and/or comprising dialkylaminoalkyl methacrylate units. These monomers can be used in the polymerization reaction in the form of the free bases, but are preferably used in the form of the salts with mineral acids, such as hydrochloric acid, sulfuric acid, or phosphoric acid, or else in quaternized form. An example of a quaternizing agent that can be used is dimethyl sulfate, diethyl sulfate, methyl chloride, ethyl chloride, cetyl chloride, or benzyl chloride. These monomers are used together with suitable ethoxylated (meth)acrylates (e.g. Bisomer® MPEG 350 MA, Bisomer® MPEG 550 MA, Bisomer® S7W, Bisomer® S10W or Bisomer® S20W) or other vinyl monomers (e.g. Pluriol® A10R, Pluriol® A11R, Pluriol® A46R) to produce either binary or multiple copolymers. Examples of suitable additional comonomers are acrylamide, methacrylamide, N-vinylformamide, N-vinylpyrrolidone, methyl acrylate, ethyl acrylate, methyl methacrylate, and mixtures of the monomers mentioned.

Ethoxylated cationic polymers of group (f) are polymers comprising dimethylaminoethyl acrylamide units or comprising dimethylaminoethyl methacrylamide units, which preferably comprise the basic monomers in the form of the salts with mineral acids, or in quaternized form. As with cationic polymers of group (e), these materials can be either binary or multiple copolymers with suitable alkoxylated vinyl monomers. Examples are copolymers of dimethylaminoethyl acrylamide which has been completely quaternized with dimethyl sulfate or with benzyl chloride, homopolymers of dimethylaminoethyl methacrylamide which has been completely quaternized with dimethyl sulfate, with methyl chloride, with ethyl chloride, or with benzyl chloride, and copolymers of acrylamide and dimethyl-sulfate-quaternized dimethylaminoethyl acrylamide. Manufacture of such copolymers is exemplified in WO 2005/049676 (copolymer 4).

The following cationic polymers are preferably used in the production of the aqueous composition of the invention:
(a) ethoxylated homopolymers of vinylimidazolium methosulfate and/or copolymers of vinylimidazolium methosulfate and N-vinylpyrrolidone with average molecular weight $M_w$ of from 1000 to 100 000 in each case,
(b) ethoxylated polydiallyldimethylammonium chlorides with average molecular weight $M_w$ of from 2000 to 100 000, and/or
(c) ethoxylated polyvinylamines with average molecular weight $M_w$ of from 1000 to 500 000. The polyvinylamines are preferably used in the form of the salts with sulfuric acid or hydrochloric acid and
(d) ethoxylated polyethyleneimines with weight average molecular weight $M_w$ of from 500 to 1 million.

Polymers that can be used as ethoxylated cationic polymers are not only those polymers composed solely of cationic monomers but also amphoteric polymers, with the proviso that the net charge that they bear is cationic. By way of example, the excess of cationic charge in the amphoteric polymers is at least 5 mol %, preferably at least 10 mol %, and mostly in the range from 15 to 95 mol %. Examples of amphoteric polymers having an excess of cationic charge are
copolymers of acrylamide, dimethylaminoethyl acrylate and acrylic acid, comprising at least 5 mol % more dimethylaminoethyl acrylate than acrylic acid as comonomer;
copolymers of vinylimidazolium methosulfate, N-vinylpyrrolidone, and acrylic acid, comprising at least 5 mol % more vinylimidazolium methosulfate than acrylic acid as comonomer;
hydrolyzed copolymers of N-vinylformamide and of an ethylenically unsaturated $C_3$ to $C_5$ carboxylic acid, preferably acrylic acid or methacrylic acid, with at least 5 mol % higher content of vinylamine units than units of ethylenically unsaturated carboxylic acids; and
copolymers of vinylimidazole, acrylamide, and acrylic acid, where the pH has been selected in such a way that the amount of vinylimidazole cationically charged is at least 5 mol % more than the amount of copolymerized acrylic acid.

Basic polymers are preferably used in the form of the salts with mineral acids or with organic acids, such as formic acid or acetic acid.

Embodiments of the invention are the use of polyelectrolyte complexes formed from
homopolymers of acrylic acid and ethoxylated polymers comprising vinylimidazolium units;
homopolymers of acrylic acid and ethoxylated homopolymers having vinylimidazolium units;
homopolymers of acrylic acid and ethoxylated copolymers of monomers having vinylimidazolium units and of vinyllactams, in particular vinyl pyrrolidone;
copolymers of acrylic acid with 2-acrylamido-2-methylpropanesulfonic acid and ethoxylated polymers comprising vinylimidazolium units;
copolymers of acrylic acid with 2-acrylamido-2-methylpropanesulfonic acid and ethoxylated homopolymers having vinylimidazolium units;
copolymers of acrylic acid with 2-acrylamido-2-methylpropanesulfonic acid and ethoxylated copolymers of monomers having vinylimidazolium units and of vinyllactams, in particular vinylpyrrolidone
homopolymers of acrylic acid and ethoxylated polyethylene imine.

Preferred ethoxylated cationic polymers are in particular cationic polymers selected from the group consisting of ethoxylated polymers comprising vinylimidazolium units, ethoxylated polydiallyldimethylammonium halides, ethoxylated polymers comprising vinylamine units, ethoxylated polymers comprising ethyleneimine units, ethoxylated polymers comprising dialkylaminoalkyl acrylate units, ethoxylated polymers comprising dialkylaminoalkyl methacrylate units, ethoxylated polymers comprising dialkylaminoalkylacrylamide units, and ethoxylated polymers comprising dialkylaminoalkyl methacrylamide units.

The cationic polymers can be prepared for example by radical polymerization of suitable monomers. Suitable cationic monomers which may be copolymerized with non-cationic monomers are dialkylaminoethyl acrylates, dialkylaminoethyl methacrylates, dialkylaminopropyl acrylates, dialkylaminopropyl methacrylates, dialkylaminoethylacrylamides, dialkylaminoethylmethacrylamides, dialkylaminopropylacrylamides, dialkylaminopropylmethacrylamides, diallyldimethylammonium chloride, vinylimidazole, and also the respective basic monomers neutralized with acids and/or quaternized. Individual examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, and diethylaminopropyl methacrylate, dimethylaminoethylacrylamide, dimethylaminoethylmethacrylamide, dimethylaminopropylacrylamide, dimethylaminopropylmethacrylamide, diethylaminoethylacrylamid, and diethylaminopropylacrylamide.

The basic monomers can have been completely or only to some extent neutralized and, respectively, quaternized, for example to an extent of from 1 to 99% in each case. Preferred quaternizing agent used for the basic monomers is dimethyl sulfate. However, the monomers can also be quaternized with diethyl sulfate or with alkyl halides, such as methyl chloride, ethyl chloride, or benzyl chloride.

The polymerization reaction can also be conducted in the presence of at least one crosslinking agent. This then gives copolymers with higher molar mass than when the anionic monomers are polymerized in the absence of any crosslinking agent. Incorporation of a crosslinking agent into the polymers moreover gives reduced solubility of the polymers in water. As a function of the amount of copolymerized crosslinking agent, the polymers become insoluble in water, but are swellable in water.

Crosslinking agents used can comprise any of the compounds that have at least two ethylenically unsaturated double bonds within the molecule. Examples of crosslinking agents are triallylamine, the triallyl ether of pentaerythritol, the tetraallyl ether of pentaerythritol, methylenebisacrylamide, N,N'-divinylethyleneurea, allyl ethers comprising at least two allyl groups, or vinyl ethers having at least two vinyl groups, where these ethers derive from polyhydric alcohols, e.g. sorbitol, 1,2-ethanediol, 1,4-butanediol, trimethylolpropane, glycerol, diethylene glycol, and from sugars, such as sucrose, glucose, mannose; other examples are dihydric alcohols which have from 2 to 4 carbon atoms and which have been completely esterified with acrylic acid or with methacrylic acid, e.g. ethylene glycol dimethacrylate, ethylene glycol diacrylate, butanediol dimethacrylate, butanediol diacrylate, diacrylates or dimethacrylates of polyethylene glycols with molecular weights from 300 to 600, ethoxylated trimethylenepropane triacrylates or ethoxylated trimethylenepropane trimethacrylates, 2,2-bis (hydroxymethyl)butanol trimethacrylate, pentaerythritol triacrylate, pentaerythritol tetraacrylate, and triallylmethylammonium chloride. If crosslinking agents are used in the production of the dispersions of the invention, examples of the respective amounts used of crosslinking agent are from 0.0005 to 5.0% by weight, preferably from 0.001 to 1.0% by weight, based on the entirety of monomers used in the polymerization reaction. Crosslinking agents preferably used are the triallyl ether of pentaerythritol, the tetraallyl ether of pentaerythritol, N,N'-divinylethyleneurea, allyl ethers of sugars such as sucrose, glucose or mannose, where these ethers comprise at least two allyl groups, and triallylamine, and also mixtures of these compounds.

The aqueous composition preferably comprises at least on ethoxylated polyethyleneimine. Polyethyleneimines are polymers comprising ethyleneimine units. They are preferably branched. The polyethyleneimines can be used neutralized in the form of the salts with suitable acids but are preferably used in unneutralized form.

In one embodiment of the invention, the polyethyleneimine is selected from highly branched or dendritic polyethyleneimines. Highly branched polyethyleneimines are characterized by their high degree of branching (DB).

The DB can be determined by $^{13}$C-NMR-spectroscopy, preferably in D$_2$O, and is defined as:

$$DB=D+T/(D+T+L)$$

wherein D (dendritic) correlates to the amount of tertiary amine groups, L (linear) correlates to the amount of secondary amine groups and T (terminal) correlates to the amount of primary amine groups. Highly branched polyethyleneimines according to the invention have a DB of preferably from 0.1 to 0.95, or from 0.25 to 0.9, more preferred from 0.30 to 0.80 and especially preferred of at least 0.5. Dendritic polyethyleneimines have a structural and molecular uniform constitution (DB=1).

The weight average molecular weight of the ethoxylated polyethylene imines is preferably at least 2500 g/mol, more preferably at least 10000 g/mol, for example from 2500 to 3 million g/mol or from 10000 to 2 million g/mol or from 10000 to 500000 g/mol. The charge density of the polyethylene imines is preferably from 1 to 35 meq/g, more preferably from 5 to 25 meq/g. Charge density can be measured by titration of aqueous solutions of the polyethyleneimine with potassium polyvinyl sulfate (KPVS) at pH 4.5 with toluidine blue as indicator.

Suitable polyethyleneimines are polymers of ethyleneimine which are produced via polymerization of ethyleneimine in an aqueous medium in the presence of small amounts of acids or of acid-forming compounds, examples being halogenated hydrocarbons, e.g. chloroform, carbon tetrachloride, tetrachloroethane, or ethyl chloride, or are condensates of epichlorohydrin and compounds comprising amino groups, examples being mono- and polyamines, e.g. dimethylamine, diethylamine, ethylenediamine, diethylenetriamine, and triethylenetetramine, or ammonia.

This group of cationic polymers also includes graft polymers of ethyleneimine on compounds having a primary or secondary amino group, examples being polyamidoamines made of dicarboxylic acids and of polyamines. The ethyleneimine-grafted polyamidoamines can also, if appropriate, be reacted with bifunctional crosslinking agents, for example with epichlorohydrin or with bischlorohydrin ethers of polyalkylene glycols.

In one embodiment, the polyethyleneimine is crosslinked. Any crosslinking agent with at least two functional groups capable of forming covalent bonds with amine groups of the polyethyleneimine can be used for crosslinking. Suitable crosslinking agents are for example alkyldialdehyds with preferably 3 to 20 C-atoms such as glutaraldehyd (1,5-pentanedial).

The aqueous composition may comprise water as the only solvent or it may comprise a mixture of water and water miscible organic solvents such as methanol, ethanol, acetone or tetrahydrofuran. Preferably water is the only solvent. The pH is preferably from 6 to 12, more preferably from 7 to 10.

Ethoxylated polyethylene imines are described in WO 09/060059, WO 06/108856, WO 15/028191 and the literature cited therein.

The degree of ethoxylation of the ethoxylated cationic polymer (b) is preferably from 40:1 to 1:10, preferably from 30:1 to 2:1 based on the weight amount of CH2CH2O-units to the other polymer components.

The term "ethoxylated" in the at least one ethoxylated cationic polymer (b) refers to alkoxylated polymers in general and does not exclude respective copolymers of ethylene oxide with other epoxides like propylene oxide, butylene oxide or styrene oxide. Such copolymers may be either random or exhibit block-like structure. The amount of ethylene oxide in such copolymers is preferably more than 70 mol %, more preferably more than 80 mol % and even more preferable more than 90 mol %. Most preferable, homopolymers of ethylene oxide are employed.

Ethoxylated cationic polymers can be made by methods generally known in the art, for example
1) copolymerization of cationic monomers with polyethylene glycol-functional (PEG-functional) monomers, for example one or more of the following PEG-functional monomers:

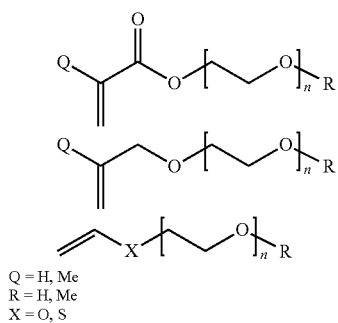

Q = H, Me
R = H, Me
X = O, S with n=number of ethylene oxide units, preferably from 2 to 50
2) grafting of cationic polymers (e.g. polyethylene imine) by reaction with ethylene oxide
3) grafting of (meth)acrylic ester copolymers by trans-esterification or trans-amidation with suitable polyethylenoxide compounds such as for example HO—(CH$_2$CH$_2$O)$_n$—R, or H$_2$N—(CH$_2$CH$_2$O)$_n$—R with R=alkyl, preferable C1- to C4 alkyl such as methyl, ethyl, propyl, n-butyl; n=number of ethylene oxide units, preferably from 2 to 70
   ring opening of maleic acid anhydride copolymers and esterification or amidation with the above-mentioned polyethylene oxide compounds.

Preferred ethoxylated polyalkylenimines or ethoxylated polyamines are of the general formula I $$E_2N-R+N-R+_yN-R+_z NE_2 \quad \text{I}$$

in which the variables are each defined as follows:
R represents identical or different, linear or branched C$_2$-C$_{12}$-alkylene radicals or an etheralkyl unit of the following formula:

$$-R^{10}+O-R^{11}+_dO-R^{12}-$$

in which the variables are each defined as follows:
R$^{10}$, R$^{11}$, R$^{12}$ represent identical or different, linear or branched C$_2$-C$_6$-alkylene radicals, preferably ethylene, and
d is an integer having a value in the range of from 0 to 50, preferably 1 to 5;
B represents a continuation of the ethoxylated polyalkylenimines or ethoxylated polyamines by branching E is an alkylenoxy unit of the formula II, wherein the alkylenoxy units may be in any order

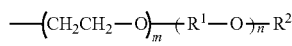

in which the variables are each defined as follows:
$R^1$ represents 1,2-propylene, 1,2-butylene, 1,2-isobutylene and/or 1,2-pentene;
$R^2$ represents hydrogen and/or $C_1$-$C_{22}$-alkyl and/or $C_7$-$C_{22}$ aralkyl, preferably $C_1$-$C_6$-alkyl;
m is an integer having a value in the range of from 5 to 50;
n is an integer having a value in the range of from 0 to 40;
y and z are each from 0 to 150, where the sum of y+z is at least 1;
wherein the number of ethyleneoxy groups is more than 50%, preferably more than 70%, or more than 80% or 100% of all alkylenoxy groups.

R is preferably linear or branched $C_2$-$C_6$-alkylene, more preferred ethylene.

The aqueous composition contains at least one phyllosilicate. Phyllosilicates are a subgroup of silicate minerals. Phyllosilicates are sheet silicate materials (layered silicates), formed by parallel sheets of silicate tetrahedra with $Si_2O_5$ or a 2:5 ratio. The tetrahedral layers alternate with octahedron layers. In the octahedral layers are cations surrounded by hydroxide ions and/or oxygen in octahedral coordination. The actual layers themselves are usually charged negatively and the charges are partially offset by additional cations in the interstices of the respective layers. These additional cations are to be distinguished from the foregoing cations in the octahedral layers. Many phyllosilicates may be well swollen in water and/or dispersed. This process is called exfoliation (or synonymously delamination).

The phyllosilicate may be natural or synthetic. They have an aspect ratio of preferably at least 50, more preferably more than 400, or more than 1000 and most preferably more than 10000.

The mode of barrier action of phyllosilicates is due to their high aspect ratio (ratio of width to thickness). The starting clay materials are layered structures which can be exfoliation and delaminated in a known manner which—in an idealized case—leads to individual platelets with thicknesses of preferably greater or equal 10 nm, ideally about 1 nm corresponding to a single clay layer.

The layer charge is preferably from 0.01 to 2.0 per formula unit, preferably from 0.3 to 0.95 and ideally from 0.4 to 0.6.

The phyllosilicates may be modified or unmodified. Preference is given to modified phyllosilicates.

The phyllosilicates may be selected from montmorillonite, bentonite, kaolinite, mica, hectorite, fluorohectorite, saponite, beidellite, nontronite, stevensite, vermiculite, fluorovermiculite, halloysite, volkonskoite, suconite, magadite, sauconite, stibensite, stipulgites, attapulgites, illites, kenyaite, smectite, allevardite, muscovite, palygorskite, sepiolite, silinait, grumantite, revdite, zeolites, fuller's earth, natural or synthetic talc and mica, or of synthetic origin, such as permutites. Most preferred are exfoliated, organically modified smectites.

These phyllosilicates are composed of packets of face to face stacking of individual silicate layers or sheets. The thickness of the sheets is typically about 1 nm and the longest length of the sheets is typically from 50 to 1000 nm or even longer, resulting in aspect ratios of 50 to 1000. As described by Breu et al. (Nanoscale 2012, 4, 5633-5639), aspect ratios of more than 10000 can be realized for synthetic clays.

Preferred are montmorillonite (aluminium magnesium silicate), hectorite (magnesium lithium silicate) clays, with synthetic fluorohectorite being the most preferred. Also preferred are exfoliated smectite types.

Preferred synthetic phyllosilicates are synthetic smectites. Preferred synthetic smectites are those of the formula

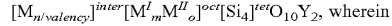

M are metal cations of oxidation state 1 to 3, or $H^+$,
$M^I$ metal cations of oxidation state 2 or 3,
$M^{II}$ are metal cations of oxidation state 1 or 2,
X are di-anions and
Y are mono-anions,
m for metal atoms $M^I$ of oxidation state 3 is ≤2.0
and m for metal atoms $M^I$ of oxidation state 2 is ≤3.0,
o is ≤1.0 and
the layer charge n is from 0.01 to 2.0, preferably from 0.3 to 0.95 and ideally from 0.4 to 0.6.

M preferably has oxidation state 1 or 2. M is particularly preferably $Li^+$, $Na^+$, $Mg^{2+}$, or a mixture of two or more of those ions. M is most particularly preferably $Na^+$ or $Li^+$.
$M^I$ is preferably $Mg^{2+}$, $Al^{3+}$, $Zn^{2+}$, $Fe^{2+}$, $Fe^{3+}$ or a mixture of two or more of those ions.
$M^{II}$ is preferably $Li^+$, $Mg^{2+}$ or a mixture of those cations.
Y is preferably $OH^-$ or $F^-$, particularly preferably $F^-$.

According to a particularly preferred embodiment of the invention, M is $Li^+$, $Na^+$, $H^+$ or a mixture of two or more of those ions, $M^I$ is $Mg^{2+}$, $M^{II}$ is $Li^+$, and Y is $F^-$.

A synthesis procedure of suitable synthetic layered silicates is described in M. Stoter et al., Langmuir 2013, 29, 1280-1285. A method for producing suitable and preferred phyllosilicates having high aspect ratios is described in WO 2011/089089. Synthetic phyllosilicates may be prepared by high-temperature melt synthesis, followed by exfoliation and/or delamination to give phyllosilicate platelets having a high aspect ratio, e.g. as described in WO 2011/089089 or in WO 2012/175431. By means of this process it is possible to obtain phyllosilicate platelets having an average aspect ratio greater than 400. A further advantage of the phyllosilicate platelets obtainable by this process is that, unlike natural montmorillonites and vermiculites, which are more or less yellowish-brown in colour, they are colourless. This allows colourless composite materials to be produced therefrom.

Suitable phyllosilicates may also be produced hydrothermally, for example hydrothermally produced smectite such as Optigel® SH. It is well known to produce hectorite synthetically via hydrothermal processing. For example, U.S. Pat. Nos. 3,954,943 and 3,586,478 teach the synthesis of fluorine containing hectorite by a hydrothermal process. WO 2014/164632 teaches suitable synthetic zinc hectorite via hydrothermal preparation.

Preferably, the phyllosilicates are surface-modified with at least one organic compound having at least one group selected from amino groups and ammonium groups. Different type of cationic modification can be used to replace metal cations (e.g. sodium cations) from the surface of the delaminated phyllosilicates. The surface modification can provide stabilization of the delaminated or exfoliated phyllosilicates and compatibilization with polymers (a) and (b).

Cationic modification means that an organic moiety has been strongly attached to the phyllosilicate by a treatment of subjecting the phyllosilicate to an ion exchange process whereby inorganic cations present in the phyllosilicate are replaced by organic cations comprising, but not limited to, either an organic group bonded to a cationic salt group, such as quaternary ammonium, phosphonium, pyridinium or the like, or an organic compound containing a cationic amine salt.

The phyllosilicates are made organophilic by ion-exchanging organic or polymeric molecules between the inorganic layers, e.g. according to a process as described in U.S. Pat. No. 5,578,672. By way of example, mention may be made of the organophilic clays described in U.S. Pat. No. 6,117,932. Preferably, the clay is modified with an organic substance by ionic bonding with an onium ion having preferably 4 carbon atoms or more. If the number of carbon atoms is less than 4, the organic onium ion might be too hydrophilic and therefore the compatibility with the polymer matrix may decrease. By way of example of organic onium ion, mention may be made of hexylammonium ions, octylammonium ions, 2-ethylhexylammonium ions, dodecylammonium ions, laurylammonium ions, octadecylammonium (stearylammonium) ions, dioctyldimethylammonium ions, trioctylammonium ions, distearyldimethylammonium ions, stearyltrimethylammonium ions and ammonium laurate ions. It is recommended to use a clay having the highest possible surface of contact with the polymer.

Other examples of organic onium ions or their precursors used for cationic modification may be selected from amino acids like glycine, alanine, lysine, ornithine or their derivatives; e.g. L-lysine monohydrochloride or N,N,N-trimethylglycine hydrochloride (=betaine); from amino alcohols like ethanol amine, N,N'-dimethyl ethanolamine, N,N'-dimethylamino ethoxyethanol, diethanol amine, triethanolamine, 2-amino-2-(hydroxymethyl)-1,3-propandiol (=TRIS); or from alkoxylated amines or amides like ethoxylated ethylene diamine (e.g. Mazeen® 184, Tetronic® 90R4, Tetronic® 904 or Tetronic® 1107), ethoxylated fatty amines (e.g. Lutensol® FA 12, Lutensol® FA 12K), ethoxylated fatty acid amides (e.g. Lutensol® FSA 10) or polyether amines like Jeffamine® M-600, M-1000, M-2005 or M-2070 from the Jeffamine® M-series or Polyamine D-230, D-400, D-2000, T-403 or T-5000 from BASF. Preferred modifiers are betaine, TRIS, lysine, alkoxylated ethylene diamines or ethoxylated fatty amines.

The cationic exchange capacity of the phyllosilicates is preferably from 50 and 200 milliequivalents per 100 g. The proportion of organic onium ion is advantageously from 0.3 to 3, preferably from 0.3 to 2 equivalents of the ion exchange capacity of the clay.

One embodiment of the invention is a polymer film coated with an aqueous composition as described above, in particular a polymer film comprising an oxygen barrier coating obtainable via the use of an aqueous composition as described above, wherein at least one side of the polymer film has been coated with an aqueous composition comprising
(a) at least one polyanion,
(b) at least one ethoxylated polyethyleneimine, and
(c) at least one phyllosilicate.

The oxygen transmission rate of the coated film is preferably less than 40% of the oxygen transmission rate of the uncoated film, measured at 25° C. and 75% relative humidity.

The aqueous composition used for the coating process can comprise further additives or auxiliaries, e.g. thickeners for adjusting rheology, wetting aids, or binders. Preferred polymer film substrates are polymer films which are suitable for packaging.

Preferred polymer films are made of oriented polypropylene or polyethylene, where the polyethylene can be produced from ethylene either by the high-pressure polymerization process or by the low-pressure polymerization process. Examples of other suitable polymer films are made of polyester, such as polyethylene terephthalate, and films made of polyamide, polystyrene and polyvinyl chloride. In one embodiment, the polymer film is biodegradable, e.g. made of biodegradable aliphatic-aromatic copolyesters and/or polylactic acid, an example being Ecoflex® films or Ecovio® films. Examples of suitable copolyesters are those formed from alkanediols, in particular C2 to C8 alkanediols, e.g. 1,4-butanediol, and from aliphatic dicarboxylic acids, in particular C2 to C8 dicarboxylic acids, e.g. adipic acid, and from aromatic dicarboxylic acids, e.g. terephthalic acid. Preferred polymer film materials are selected from polyethylene terephthalate, oriented polypropylene, casted polypropylene, polyethylene, biodegradable aliphaticaromatic copolyesters, metalized polyethylene terephthalate, metalized oriented polypropylene and polyamide.

The thickness of the polymer film can be in the range from 5 to 200 µm, in the case of films made of polyamide from 5 to 50 µm, in the case of films made of polyethylene terephthalate from 10 to 100 µm, in case of oriented polypropylene form 10 to 100 µm, in the case of films of polyvinyl chloride about 100 µm, and in the case of films made of polystyrene about 30-75 µm.

Preferably, the oxygen barrier coating on the polymer film is pore-free, which can be analyzed by atomic force microscopy (AFM) or scanning electron microscope (SEM).

One object of the invention is a method of forming a polymeric film with enhanced oxygen barrier properties comprising:
applying an aqueous composition according to the invention as described above to at least one side of the polymer film, and
drying said composition to form a barrier coating on the polymer film.

The aqueous composition can be applied by typical coating machinery to a backing film made of a plastic. If materials in the form of webs are used, the aqueous composition is usually applied from a trough by way of an applicator roll and rendered uniform with the aid of an air knife. Other suitable possibilities for applying the coating use the reverse gravure process, or spray processes, or a spreader system that uses a roll, or other coating processes known to the person skilled in the art. The aqueous composition can also be applied in a multi-coating process, wherein a first coating is followed by a second or more coating. A preferred coating method is spray coating, e.g. airbrush coating.

Other suitable coating processes are the known intaglio printing and relief printing processes. Instead of using different inks in the printing-ink units, the process here by way of example uses a printing process for application of the aqueous polymer solution. Printing processes that may be mentioned are the flexographic printing process as a relief printing process known to the person skilled in the art, the gravure process as an example of intaglio printing, and offset printing as an example of flatbed printing. Modern digital printing, inkjet printing, electrophotography and direct imaging can also be used.

In order to achieve a further improvement in adhesion on a polymer film, the backing film can be previously subjected to corona treatment. Examples of the amounts applied to the sheet materials are preferably from 0.2 to 50 g (polymer, solid) per $m^2$, preferably from 0.5 to 20 $g/m^2$ or from 1 to 15 $g/m^2$.

In order to achieve a further improvement in adhesion on a polymer film, a pre-coating or a primer can be applied on the polymer film before coating the oxygen barrier onto the substrate. Such primers can be based on polyurethane dispersions, polyurethane solutions, solvent-free or solvent based reactive polyurethane, polyethylene imine, polyacrylates or other primers known to the person skilled in the art.

Once the aqueous coating composition has been applied to the sheet substrates, the solvent is evaporated. For this, by way of example, in the case of continuous operation, the material can be passed through a drying tunnel, which can have an infrared irradiation apparatus. The coated and dried material is then passed over a cooling roll and finally wound up. The thickness of the dried coating is preferably from 0.2 to 50 μm, particularly preferably from 0.5 to 20 μm, most preferred from 1-15 μm.

The substrates coated with the aqueous coating composition exhibit excellent oxygen-barrier action, in particular in high humidity environments. The coated substrates can be used for example as means of packaging, preferably for packaging foods. The coatings have very good mechanical properties and exhibit, for example, an extraordinary flexibility.

The oxygen barrier coating can also be used as a barrier coating against other substances. Such substances can be carbon dioxide, nitrogen, bisphenol A (BPA), mineral oil, fat, aldehydes, grease, plasticizer, photoinitiators or aroma substances.

In order to obtain specific additional surface properties or specific coating properties of the coated polymer films, for example good printability, or further improved sealing and nonblocking properties, or good water-resistance, it can be advantageous to overcoat the coated substrates with topcoat layers which provide these desired additional properties. The substrates precoated with the aqueous coating composition according to the invention can readily be overcoated. For the overcoating process, one of the processes mentioned above can be repeated, or repeated coating can be carried out in a continuous process without any intervening wind-up and unwind of the foil. The location of the oxygen barrier layer can thus be in the interior of the system, and the surface properties are then determined by the topcoat layer. The topcoat layer has good adhesion to the oxygen-barrier layer. Due to the good humidity resistance, it is in particular not necessary to apply an additional moisture-protection coating to ensure that the oxygen-barrier layer is effective even at relatively high humidity levels.

In one embodiment, a polymer film of the invention comprises in addition to the oxygen barrier coating at least one additional layer made from materials selected from the group consisting of polyacrylates, polyvinylidene chloride (PVDC), waxes, epoxy resins, UV curable acrylates and polyurethanes.

In one embodiment of the invention a polymer film of the invention as described above is laminated with at least one additional material wherein the at least one additional material is selected from polyethylene terephthalate, oriented polypropylene, polyethylene, casted polypropylene, biodegradable aliphatic-aromatic copolyesters, metalized polyethylene terephthalate, metalized oriented polypropylene, polyamide, paper and board.

Another object of the invention is a package comprising a polymer film according to the invention as described above.

Another object of the invention is the use of an aqueous composition according to the invention as described above for providing oxygen barrier properties.

EXAMPLES

Measurement of Oxygen-barrier Action:

Oxygen transmission rate (OTR) is determined on coatings on polymer films at a relative humidity (RH) level of 75% and at a temperature of 25° C.

Measurements are done with synthetic air (21% oxygen; results are extrapolated for 100% oxygen.

Carrier material: polymer film of PET (polyethylene terephthalate) with a thickness of 50 μm. OTR of the uncoated film: $27.4 \pm 0.2 \text{ cm}^3/(\text{m}^2*d)$.

The determination method is based on ASTM D3985-05, using a coulometric sensor. Each sample is measured twice and the mean result is calculated.

OTR are obtained on a Mocon OX-TRAN 2/21 XL instrument with a lower detection limit of 0.0005 $\text{cm}^3$ $\text{m}^{-2}$ $\text{day}^{-1}$ $\text{bar}^{-1}$.

Water vapour transmission rates (WVTR) were measured on a Mocon PERMATRAN-W model 333 at 25° C. and a relative humidity of 75% RH. The lower detection limit of the device was 0.05 g $\text{m}^{-2}$ $\text{day}^{-1}$.

Polymer Samples:
PEI1 33 wt. % aqueous solution of polyethyleneimine, Mw=750000 g/mol; charge density 17 meq/g, pH=11
PEIE ethoxylated polyethyleneimine, 80 wt. % in water; Mw=13000 g/mol molar ratio of ethylene oxide units to ethyleneimine units=20:1 (degree of ethoxylation=20.5:1)

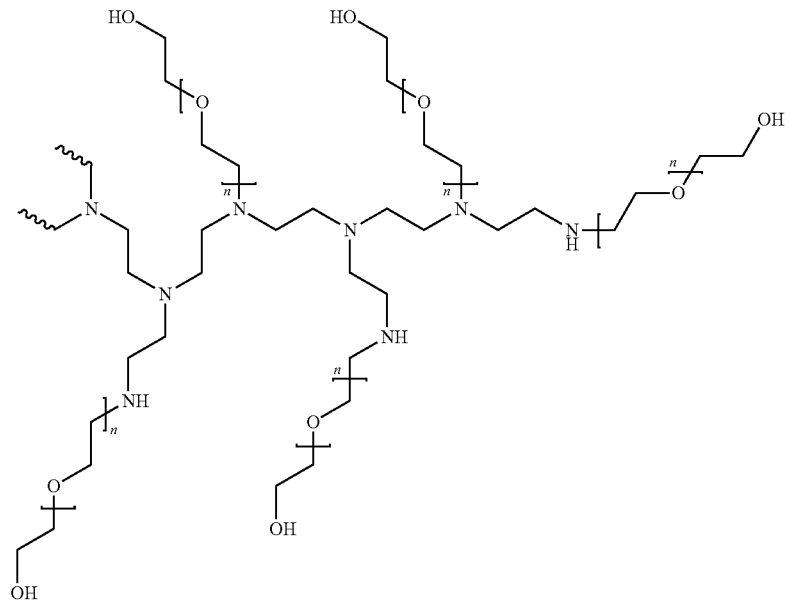

PAA polyacrylic acid, Mw=100000 g/mol; 35 wt % in water,
PPE1 polyelectrolyte complex made from PAA and PEIE in a weight ratio of 70:30, pH 4.3
PPE2 polyelectrolyte complex made from PAA and PEIE in a weight ratio of 90:10, pH 4.2
PPE3 polyelectrolyte complex made from PAA and PEIE in a weight ratio of 70:30, pH 3.3

Phyllosilicates:
Na-hect synthetic sodium fluorohectorite
L-hect hectorite modified with L-lysine
BT-hect hectorite modified with betaine
Tris-hect hectorite modified with 2-Amino-2-(hydroxymethyl)-1,3-propanediol (TRIS)

Modification Agents:
L-lysine: (S)-2,6-Diaminohexanoic acid monohydrochloride $C_6H_{14}N_2O_2 \cdot HCl$, reagent grade ≥98%, Sigma-Aldrich GmbH, Germany.

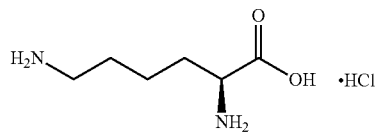

Betaine: N,N,N-trimethylglycine (anhydrous), $C_5H_{11}NO_2$, Alfa Aesar GmbH, Germany

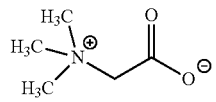

TRIS: 2-Amino-2-(hydroxymethyl)-1,3-propanediol, $C_4H_{11}NO_3$, reagent grade ≥99.9%, Sigma-Aldrich GmbH, Germany. The pH of 0.5 M solution of TRIS was adjusted to 5.75 with hydrochloric acid.

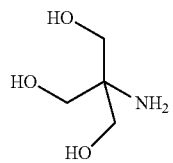

The type of phyllosilicate used in the examples is exfoliated smectite type with layer charge of 0.5 per formula unit (p.f.u.). The synthesis procedure of the used phyllosilicate is described in M. Stoter, D. A. Kunz, M. Schmidt, D. Hirsemann, H. Kalo, B. Putz, J. Senker, J. Breu, *Langmuir* 2013, 29, 1280-1285. The phyllosilicate is a synthetic sodium fluorohectorite (Na-hect) and has a cation exchange capacity of 127 meq/100 g. The chemical formula is:

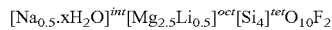

$[Na_{0.5} \cdot xH_2O]^{int}[Mg_{2.5}Li_{0.5}]^{oct}[Si_4]^{tet}O_{10}F_2$

Modification of the Sodium Fluorohectorite:

Different type of cationic modification where used to replace sodium cations from the surface of the delaminated layered silicate. Modification provides stabilization of the delaminated layered silicates and compatibilization of the layered silicate with the polymer matrix within the suspension and in the drying step of film-formation.

Example 1: Modifying Delaminated Na-hect

In a 50 ml centrifuge tube 0.25 g of Na-hect was suspended in 30 ml of distillate water. For the surface modification of the Na-hect a 125% of CEC (cation exchange capacity) of the modification agent (after dissolved in 5 ml distillate water) was added and placed into an overhead shaker for 12 h. Afterward the modified Na-hect was centrifuged at 10000 rpm, the separated supernatant was discarded and the modified Na-hect was re-suspended in distillate water and again a 125% of CEC of the modification agent (after dissolved in 5 ml distillate water) was added and placed into an overhead shaker for 12 h to ensure complete surface modification of Na-hect. At last the modified Na-hect was centrifuged at 10000 rpm and the separated supernatant was discarded and the modified Na-hect was washed with distilled water washed until the conductivity of the separated supernatant was below 25 µs.

Example 2: Mixing of Polyanion (PAA) with Ethoxylated Polyethyleneimine (PEIE) in a 70:30 Weight Ratio to Form Polyelectrolyte Complex (PPE1)

8 g of the solution of PAA in water with 35 wt % solid content was mixed with 2.5 ml of a 3M solution of $NH_3$ in water and then 1.5 g of a 80 wt.-% (solution in water) of PEIE was added. 5 ml of distilled water was added to the mixture and mixed via magnetic stirring for 4 h.

pH: 4.3

A mixture of the resulting PPE1 was coated on a PET substrate with speed blade 18 mm/s. The film was dried at 80° C. for 24 h and the OTR and WVTR were measured (see table 1).

Example 3: Suspension of Modified Phyllosilicate Na-hect with a Matrix Polyelectrolyte Complex (PPE1) with Weight Ratio 50:50

Example 3a: Modification with Betain (BT-hect50)

The amount of a Na-hect modified with BT according to procedure illustrate in example 1 was added to the required amount of PPE1 to produce a suspension with 50 wt. % (based on inorganic material, i.e. without modification agent) of phyllosilicate layer silicate in the final solid matrix (the amount of modification agent was calculated on the side of polymer). The final suspension ready to coating has a solid content of 2 wt %.

The suspension was deposited on PET foils using doctor-blading with speed of blade 18 mm/s. The film was dried at 80° C. for 24 h and the OTR and WVTR were measured (see table 1).

Example 3b Modification with TRIS (Tris-hect50)

The procedure of example 3a was applied to prepare nanocomposites using TRIS as modification of Na-hect.

The coated film was dried at 80° C. for 24 h and the OTR and WVTR were measured at 25° C. and 75% RH (see table 1).

Example 3c: Modification with L-lysine (L-hect)

The procedure of example 3a was applied to prepare nanocomposite using L-lysine as modification of Na-hect with various amounts of L-hect:

Example 3c: 50 wt.-% inorganic material (L-hect50)
Example 3c1: 10 wt.-% inorganic material (L-hect10)
Example 3c2: 20 wt.-% inorganic material (L-hect20)
Example 3c3: 30 wt.-% inorganic material (L-hect30)
Example 3c4: 40 wt.-% inorganic material (L-hect40)

The coated film was dried at 80° C. for 24 h and the OTR and WVTR were measured at 25° C. and 75% RH (see table 1).

Example 4: Mixing of Polyanion (PAA) with Ethoxylated Polyethyleneimine (PEIE) in a 90:10 Weight Ratio to Form Polyelectrolyte Complex (PPE2)

12.86 g of the solution of PAA in water with 35 wt % solid content was mixed with 4.2 ml of 3M solution of $NH_3$ in water, then 5 ml of distilled water were added and the mixture was mixed via magnetic stirring for 30 min. Then 0.63 g of 80 wt.-% solution in water of PEIE was added. The whole mixture was then homogenized via magnetic stirring for 4 h.

pH: 4.2

A mixture of the resulting PPE2 was coated on a PET substrate with blade speed of 18 mm/s. The film was dried at 80° C. for 24 h (see table 1).

Example 4a1: PPE2+BT-hect

The procedure of example 3a was applied to prepare nanocomposites using betaine as modification of Na-hect and PPE2 (example 4) as polymer matrix. The amount of inorganic silicate material was 10 wt.-% of phyllosilicate in final solid matrix.

The coated film was dried at 80° C. for 24 h and the OTR and WVTR were measured at 25° C. and 75% RH (see table 1).

Example 4a2: PPE2+L-hect

The procedure of example 3a was applied to prepare nanocomposites using L-lysine as modification of Na-hect and PPE2 (example 4) as polymer matrix. The amount of inorganic silicate material was 10 wt.-% of phyllosilicate in final solid matrix.

The coated film was dried at 80° C. for 24 h and the OTR and WVTR were measured at 25° C. and 75% RH (see table 1).

Example 5 PPE3

8 g of the solution of PAA (35 wt % solid content in water) was mixed with 0.75 ml of 3M solution of $NH_3$ in water and then 1.5 g of a 80 wt.-% solution in water of PEIE was added. 5 ml of distilled water was added to the mixture and mixed via magnetic stirring for 4 h.

pH: 3.3

A mixture of the resulting PPE3 was coated on a PET substrate with speed blade 18 mm/s. The film was dried at 80° C. for 24 h and the OTR and WVTR were measured (see table 1).

Example 5a1 PPE3+L-hect

The procedure of example 3a was applied to prepare nanocomposites using L-lysine as modification of Na-hect and PPE3 (example 5) as polymer matrix. The amount of inorganic silicate material was 20 wt.-% of phyllosilicate in final solid matrix.

The coated film was dried at 80° C. for 24 h and the OTR and WVTR were measured at 25° C. and 75% RH (see table 1).

Example 6 (Comparative)

Suspension of modified phyllosilicate Na-hect with a matrix polyelectrolyte complex of PAA and not-ethoxylated PEI1.

The procedure of example 3a was applied to prepare nanocomposite using L-lysine as modification of Na-hect and using 100 parts by weight PAA and 40 parts by weight of PEI1 instead of PEIE.

Example 7 (Comparative): PAA+L-hect (100:20)

The procedure of example 3a was applied to prepare nanocomposite using L-lysine as modification of Na-hect and using 100 parts by weight PAA only, i.e. without PEIE. The amount of inorganic silicate material was 20 wt.-% of phyllosilicate in final solid matrix.

Example 8 (Comparative): PAA+L-hect (100:50)

The procedure of example 3a was applied to prepare nanocomposite using L-lysine as modification of Na-hect and using 100 parts by weight PAA only, i.e. without PEIE. The amount of inorganic silicate material was 50 wt.-% of phyllosilicate in final solid matrix.

TABLE 1

Oxygen barrier and water vapor barrier measurement results

| Film | pH | Thickness [μm] | OTR [$cm^3\ m^{-2}\ day^{-1}\ bar^{-1}$] | WVTR [$g\ m^{-2}\ day^{-1}$] |
|---|---|---|---|---|
| Uncoated PET substrate (comp.) | — | 50 | 27.4 (±0.2) | 4.67 |
| Ex. 2 PPE1 (comp.) | 4.3 | 8 | 25.4 (±0.1) | 4.27 |
| Ex. 3a BT-hect50 | 4.5-5 | 3 | 0.11 (±0.01) 0.010 [1)] | 0.34 0.08 [1)] |
| Ex 3b T-hect50 | 4.5-5 | 2.5 | 0.54 (±0.03) | 0.53 |
| Ex. 3c L-hect50 | 4.5-5 | 2.4 | 0.2 (±0.02) 0.020 [1)] | 0.30 0.08 [1)] |
| Ex. 3c1 L-hect10 | 4.5 | 2 | 10.2 | 1.5 |
| Ex. 3c2 L-hect20 | 4.7 | 2 | 8.38 | 1.21 |
| Ex. 3c3 L-hect30 | 4.8 | 1-2 | 6.41 | 0.90 |
| Ex. 3c4 L-hect40 | 5 | 1-2 | 4.65 | 0.77 |

TABLE 1-continued

Oxygen barrier and water vapor barrier measurement results

| Film | pH | Thickness [μm] | OTR [cm³ m⁻² day⁻¹ bar⁻¹] | WVTR [g m⁻² day⁻¹] |
|---|---|---|---|---|
| Ex. 4 PPE2 (comp.) | 4.2 | 8 | 21.4 | 3.2 |
| Ex. 4a1 PPE2 + BT-hect | 4.5 | 2 | 8.02 | 2.95 |
| Ex. 4a2 PPE2 + L-hect | 4.5 | 2 | 8.23 | 1.4 |
| Ex. 5 PPE3 (comp.) | 3.3 | 13-14 | 22.78 | 2.96 |
| Ex. 5a1 PPE3 + L-hect | 3.5 | 4 | 0.82 | 0.53 |
| Ex. 6 (comp.) PAA/PEI + L-hect | | No stable formulation | No stable formulation | No stable formulation |
| Ex. 7 (comp.) PAA + L-hect 100:20 | | 3-4 | 14.6 | 3.8 |
| Ex. 8 (comp.) PAA + L-hect 100:50 | | 1-2 | 10.3 | 2.1 |

1) Film dried for 48 hours

Example 9: Modification with L-lysine (L-hect50) for Spray Coating

The procedure of example 3a was applied to prepare nanocomposite using L-lysine as modification of Na-hect and PPE1. The final formulation contained 20 wt.-% of inorganic material, based on solids with a total solids content of 2 wt.-%.

Example 10: Modification with L-lysine (L-hect50) for Spray Coating

Same composition as Example 9, but with a total solids content of 1 wt.-%.

The compositions of examples 9 and 10 were spray coated on a PET substrate (Optimont® BOPET-film; 100 μm) and the OTR and WVTR were measured (see table 2).

Spray Coating Parameters:
55 cycles (example 9); 110 cycles (example 10)
Spray device: SATAjet® 4000 LAB HVLP 1.0 mm
Carrier gas: air; inlet pressure 4 bar; outlet pressure 2-4 bar
Flow rate carrier gas: about 450 l/min at 2.5 bar
Flow rate suspension: 60 ml/min
Uniaxial application
Treadmill speed 1 m/sec
Drying: 60 sec at 60° C. with 250 W IR lamps

TABLE 2

Oxygen barrier and water vapor barrier measurement results for spray coated samples

| Film | Coating thickness [μm] | OTR [cm³ m⁻² day⁻¹ bar⁻¹] | WVTR [g m⁻² day⁻¹] |
|---|---|---|---|
| Uncoated PET substrate 100 μm | 0 | 11.5 | 1.8 |
| Ex. 9 | 2-3 | $6.68 \cdot 10^{-3}$ | <0.005 |
| Ex. 10 | 4-6 | $7.19 \cdot 10^{-4}$ | <0.005 |

The invention claimed is:

1. An aqueous composition, comprising:
(a) at least one polyanion;
(b) at least one ethoxylated cationic polymer; and
(c) at least one phyllosilicate.

2. The aqueous composition of claim 1, wherein the aqueous composition comprises:
(a) the at least one polyanion in a range of 10 to 90 wt. %, with respect to a solids content of the aqueous composition;
(b) the at least one ethoxylated cationic polymer in a range of 10 to 90 wt. %, with respect to the solids content; and
(c) the at least one phyllosilicate in a range of 5 to 75 wt. %, with respect to the solids content.

3. The aqueous composition of claim 1, wherein the at least one polyanion (a) and the at least one ethoxylated cationic polymer (b) are dissolved in the aqueous composition and wherein the at least one polyanion (a) is a polymer comprising acid groups neutralized with at least one base selected from the group consisting of an inorganic base and a monovalent organic base, said polymer comprising acid groups having a weight average molecular weight of at least 10000 g/mol prior to neutralization and wherein said at least one ethoxylated cationic polymer (b) has a weight average molecular weight of at least 2500 g/mol.

4. The aqueous composition of claim 1, wherein a weight ratio of the at least one polyanion (a), calculated without neutralizing agent, to the at least one ethoxylated cationic polymer (b) is in a range of 10:1 to 10:5 and wherein a weight ratio of the sum of the at least one polyanion (a) and the at least one ethoxylated cationic polymer (b) to the at least one phyllosilicate (c) is in a range of 95:5 to 50:50.

5. The aqueous composition of claim 1, wherein the at least one polyanion is a polymer produced from monomers selected from the group consisting of a monoethylenically unsaturated $C_3$ to $C_{10}$ carboxylic acid, vinylsulfonic acid, styrenesulfonic acid, acrylamidomethylpropanesulfonic acid, vinylphosphonic acid, and a salt thereof.

6. The aqueous composition of claim 1, wherein the at least one polyanion (a) is a neutralized polyacrylic acid or a neutralized copolymer of acrylic acid and maleic acid, and a weight average molecular weight of the at least one anionic polymer (a) is in a range of 10,000 to 200,000 g/mol.

7. The aqueous composition of claim 1, wherein a degree of ethoxylation of the at least one ethoxylated cationic polymer (b) is in a range of 40:1 to 1:10 based on a weight amount of CH2CH2O-units to the other polymer components, and a weight average molecular weight of the at least one ethoxylated cationic polymer (b) is in a range of 2500 to 3 million g/mol.

8. The aqueous composition of claim 1, wherein the at least one phyllosilicate (c) is an exfoliated organically modified smectite.

9. The aqueous composition of claim 1, wherein the at least one phyllosilicate (c) is a natural or synthetic phyllosilicate with an aspect ratio greater than 400.

10. The aqueous composition of claim 1, wherein the at least one phyllosilicate (c) is a synthetic smectite of the formula: $[M_{n/valency}]^{inter}$ $[M^I_m M^{II}_o]^{oct}$ $[Si_4]^{tet}$ $O_{10}$ $Y_2$, wherein M is $H^+$ or a metal cation with an oxidation state of 1 to 3, $M^I$ is a metal cation with an oxidation state of 2 or 3, $M^{II}$ is a metal cation with an oxidation state of 1 or 2, O is oxygen, Y is a mono-anion, m is
  ≤2.0 for each $M^I$ metal cation with an oxidation state of 3, and
  ≤3.0 for each $M^I$ metal cations with an oxidation state of 2, o is ≤1.0, and n, the layer charge, is in a range of 0.01 to 2.0.

11. The aqueous composition of claim 1, wherein a surface of the at least one phyllosilicate (c) comprises an organic compound comprising at least one group selected from the group consisting of an amino group and an ammonium group.

12. The aqueous composition of claim 1, wherein the at least one phyllosilicate (c) is hydrothermally produced or is produced by high-temperature melt synthesis and subsequent exfoliation and/or delamination.

13. The aqueous composition of claim 1, wherein the at least one ethoxylated cationic polymer (b) is selected from the group consisting of an ethoxylated vinylimidazolium polymer, an ethoxylated diallyl dimethyl ammonium halide polymer, an ethoxylated vinylamine polymer, an ethoxylated ethylene imine polymer, an ethoxylated dialkylaminoalkyl acrylate polymer, an ethoxylated dialkylammoalkyl methacrylate polymer, an ethoxylated dialkylaminoalkyl acrylamide polymer and an ethoxylated dialkylaminoalkyl methacrylamide polymer.

14. The aqueous composition of claim 1, wherein the at least one ethoxylated cationic polymer (b) is an ethoxylated polyalkylenimine or an ethoxylated polyamine of formula I:

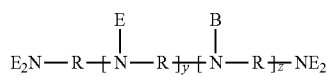

wherein:

R represents identical or different, linear or branched $C_2$-$C_{12}$-alkylene radicals or an etheralkyl unit of the following formula:

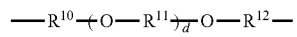

wherein:

$R^{10}$, $R^{11}$, $R^{12}$ represent identical or different, linear or branched $C_2$-$C_6$-alkyline radicals, and d is an integer in a range of 0 to 50;

B represents a continuation of the ethoxylated polyalkylenimine or the ethoxylated polyamine by branching;

E is an alkylenoxy unit of the formula II, wherein the alkylenoxy units may be in any order

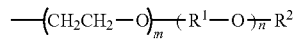

wherein:

$R^1$ represents 1,2-propylene, 1,2-butylene, 1,2-isobutylene and/or 1,2-pentene;

$R^2$ represents hydrogen and/or $C_1$-$C_{22}$-alkyl and/or $C_7$-$C_{22}$ aralkyl;

m is an integer in a range of 5 to 50;

n is an integer in a range of 0 to 40;

y and z are each from 0 to 150, where the sum of y+z is at least 1;

wherein a number of ethyleneoxy groups is more than 50% of all alkylenoxy groups.

15. The aqueous composition of claim 1, wherein the at least one ethoxylated cationic polymer (b) is an ethoxylated polyethyleneimine.

16. A polymer film, coated with the aqueous composition of claim 1.

17. The polymer film of claim 16, wherein an oxygen transmission rate of the polymer film after coating is less than 40% of an oxygen transmission rate of the polymer film before coating, both rates being measured at 25° C. and 75% relative humidity.

18. The polymer film of claim 16, wherein the polymer film comprises at least one material selected from the group consisting of a polyethylene terephthalate, an oriented polypropylene, a polyethylene, a casted polypropylene, a biodegradable aliphatic-aromatic copolyester, a metalized polyethylene terephthalate, a metalized oriented polypropylene and a polyimide, and wherein a thickness of a coating layer is in a range of 0.2 to 50 μm after drying.

19. A package, comprising the polymer film of claim 16.

20. A method of coating a polymeric film with the aqueous composition of claim 1, the method comprising:
  (a) contacting at least one side of the polymeric film with the aqueous composition and
  (b) drying said aqueous composition to form a barrier coating on the polymeric film.

* * * * *

UNITED STATES PATENT AND TRADEMARK OFFICE
CERTIFICATE OF CORRECTION

PATENT NO. : 10,570,306 B2
APPLICATION NO. : 15/742644
DATED : February 25, 2020
INVENTOR(S) : Ines Pietsch et al.

Page 1 of 2

It is certified that error appears in the above-identified patent and that said Letters Patent is hereby corrected as shown below:

In the Specification

Column 2, Line 47, "from from" should read -- from --,

Column 3, Line 21, "nonacidic" should read -- non-acidic --,

Column 3, Line 28, "anhydrids" should read -- anhydrides --,

Column 3, Line 43, "acids." should read -- acids). --,

Column 4, Line 26, "diethylaminoethylacrylamid," should read -- diethylaminoethylacrylamide, --, Column 6, Line 2, "triethanol amine." should read -- triethanolamine. --, Column 6, Line 31, "units, and" should read -- units, --, Column 6, Line 34, "units." should read -- units, and --, Column 6, Lines 35-36, "epichlorhydrine" should read -- epichlorohydrin --, Column 6, Line 36, "units" should read -- units. --, Column 8, Line 59, "acid and" should read -- acid, and --, Column 9, Line 12, delete "C₅carboxylic acid," should read -- $C_5$ carboxylic acid, --, Column 9, Line 32, delete "vinyl pyrrolidone;" should read -- vinylpyrrolidone; --, Column 9, Line 42, delete "vinylpyrrolidone" should read -- vinylpyrrolidone; --, Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

Column 10, Line 7, "diethylaminoethylacrylamid," should read -- diethylaminoethylacrylamide, --, Column 11, Lines 46-47, "alkyldialdehyds" should read -- alkyl dialdehydes --, Column 11, Line 47-48, "glutaraldehyd" should read -- glutaraldehyde --, Column 11, Line 59, "CH2CH2O" should read -- $CH_2CH_2O$ --, Column 12, Line 36, "C1- to C4" should read -- $C_1$ to $C_4$ --, Column 13, Line 54, "magadite," should read -- magadiite, --, Column 13, Line 55, "stibensite," should read -- stibnite, --, Column 15, Line 24, "propandiol" should read -- propanediol --, Column 15, Line 67, "C2 to C8" should read -- $C_2$ to $C_8$ --, Column 16, Line 2, "C2 to C8" should read -- $C_2$ to $C_8$ --, Column 18, Line 20, "oxygen;" should read -- oxygen); --, Column 18, Line 36, "Mw" should read -- $M_w$ --, Column 18, Line 38, "Mw" should read -- $M_w$ --, Column 19, Line 1, "Mw" should read -- $M_w$ --, Column 20, Line 40, "Betain" should read -- Betaine --, In the Claims Column 24, Line 67, Claim 7, "CH2CH2O" should read -- $CH_2CH_2O$ --, Column 25, Line 44, Claim 13, "dialkylammoalkyl" should read -- dialkylaminoalkyl --, Column 26, Line 10, Claim 14, ",R12" should read -- , $R^{12}$ --, Column 26, Line 11, Claim 14, "alkyline" should read -- alkylene --, Column 26, Line 49, Claim 18, "polyimide" should read -- polyamide --.